United States Patent
Carapia et al.

(10) Patent No.: US 12,090,587 B2
(45) Date of Patent: Sep. 17, 2024

(54) APPARATUS AND METHOD FOR ASSEMBLING MULTI-COMPONENT OBJECTS

(71) Applicant: I.M.A. INDUSTRIA MACCHINE AUTOMATICHE S.P.A., Ozzano Dell'emilia (IT)

(72) Inventors: Alessandro Carapia, Ozzano Dell'emilia (IT); Pierluigi Castellari, Ozzano Dell'emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/554,845

(22) PCT Filed: Apr. 19, 2022

(86) PCT No.: PCT/IT2022/050101
§ 371 (c)(1),
(2) Date: Oct. 11, 2023

(87) PCT Pub. No.: WO2022/224286
PCT Pub. Date: Oct. 27, 2022

(65) Prior Publication Data
US 2024/0198464 A1   Jun. 20, 2024

(30) Foreign Application Priority Data

Apr. 20, 2021 (IT) .................. 102021000009866

(51) Int. Cl.
*B23P 19/00* (2006.01)
*B23P 21/00* (2006.01)

(52) U.S. Cl.
CPC ........... *B23P 19/006* (2013.01); *B23P 21/004* (2013.01)

(58) Field of Classification Search
CPC ........................... B23P 19/006; B23P 21/004
See application file for complete search history.

(56) References Cited

FOREIGN PATENT DOCUMENTS

| | | |
|---|---|---|
| CN | 106271559 | 1/2017 |
| CN | 107717379 | 2/2018 |
| CN | 108544227 | 9/2018 |
| WO | 2014/004838 | 1/2014 |

OTHER PUBLICATIONS

International Search Report filed in PCT/IT2022/050101 mailed Jul. 21, 2022.

*Primary Examiner* — Moshe Wilensky
(74) *Attorney, Agent, or Firm* — RANKIN, HILL & CLARK LLP

(57) ABSTRACT

A method to produce multi-component objects, including a first component and a second component assembled to it, provides to feed the first component to a loading station, to feed the second component to the same loading station and then to assemble them so as to produce the multi-component object.

12 Claims, 2 Drawing Sheets

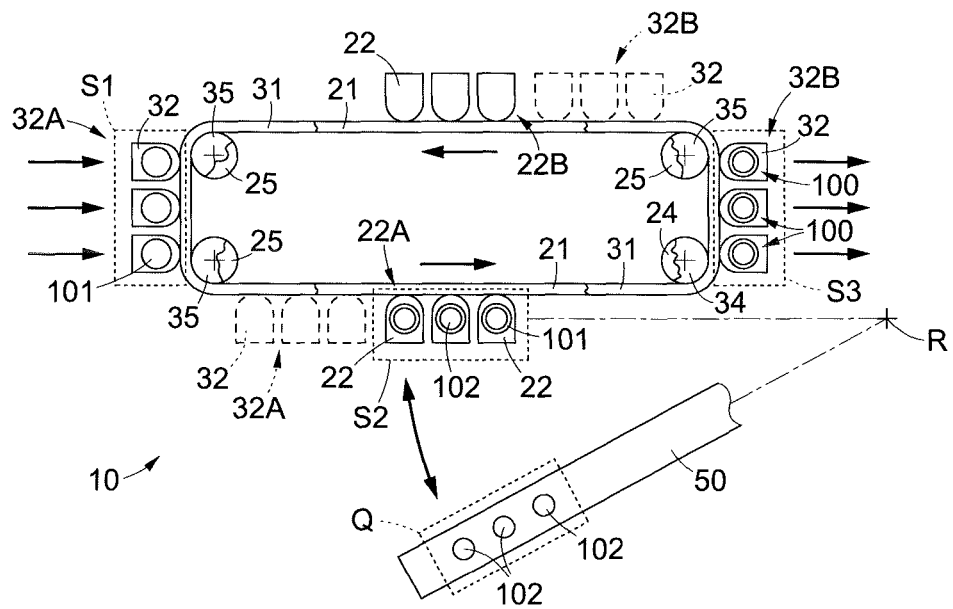
fig. 1
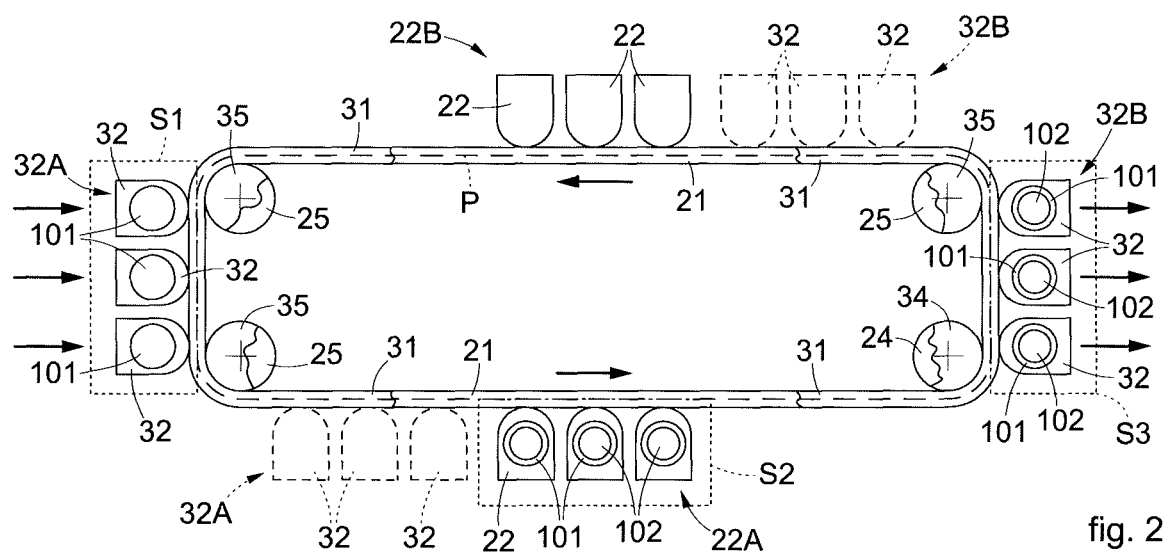
fig. 2
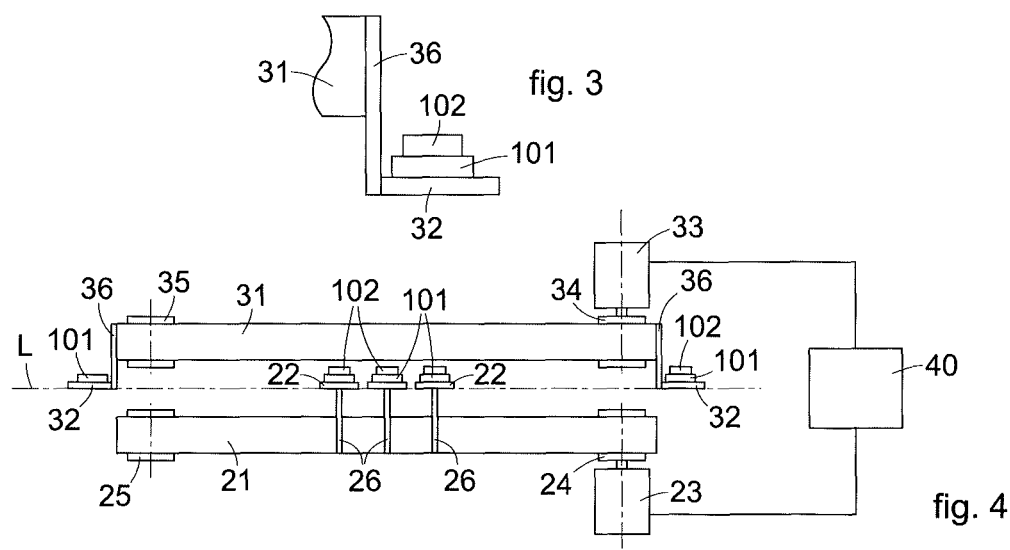
fig. 3
fig. 4

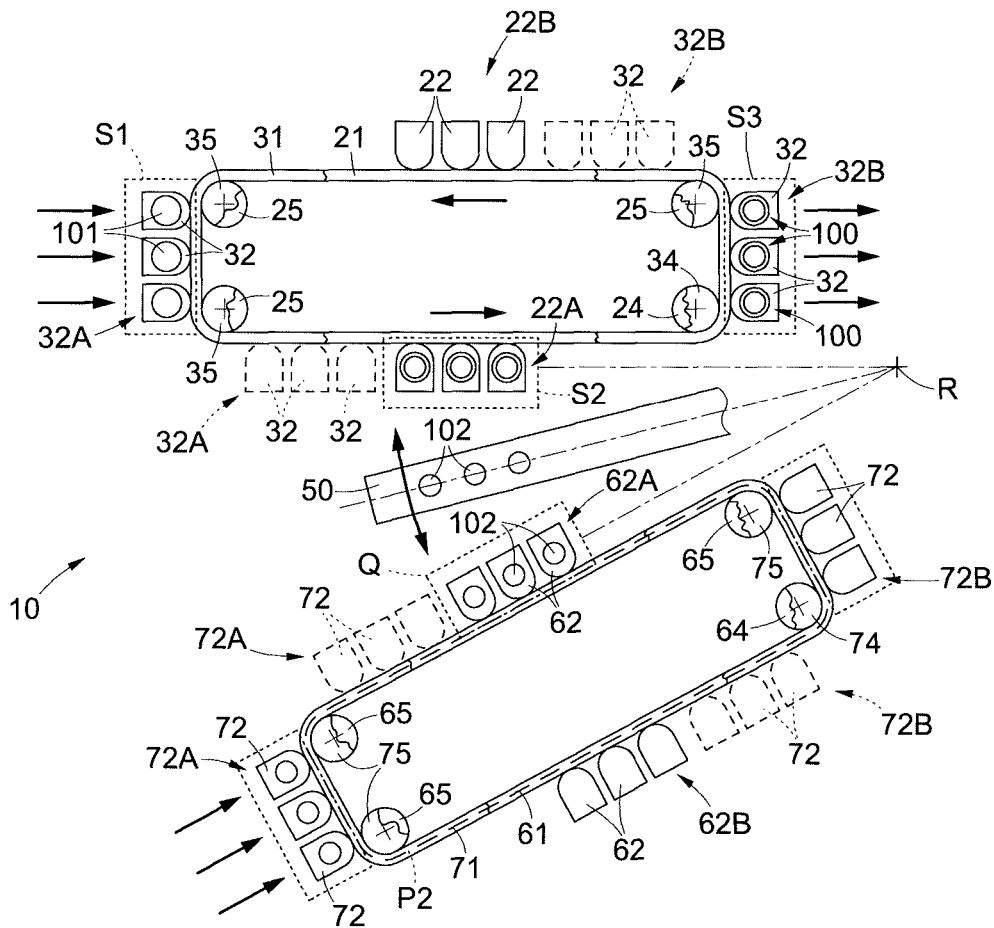
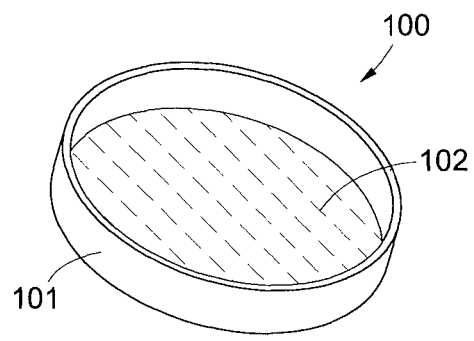
fig. 5
fig. 6

APPARATUS AND METHOD FOR ASSEMBLING MULTI-COMPONENT OBJECTS

FIELD OF THE INVENTION

The present invention concerns an assembly apparatus and an assembly method for assembling multi-component objects, that is, which comprise more than one component, typically a base component on which one or more additional components are assembled. The multi-component objects that can be assembled or produced by means of the apparatus and the method of the present invention can even have an economically low unit value, such as for example hermetic closure members for containers, such as closeable caps for containers.

BACKGROUND OF THE INVENTION

Apparatuses and methods for producing multi-component objects are known, such as for example closure caps for containers, in which it is provided to automatically assemble two or more components in order to produce the object as above.

The apparatuses of the known type comprise a transport system for the components to be assembled which allows to move them between the various processing stations. For example, suitable gripping members with which the transport system is provided receive a first component and transport it toward one or several processing stations, in which it is possible to join other additional components to the first component.

In some cases, the transport system comprises a plurality of sliders or shuttles, configured to retain the first component, which acts as a base component, while the different processing is performed on it.

For example, the processing stations as above can comprise a welding station, in which an additional component is fed in order to be assembled by welding to the first component, and/or another station in which another type of processing is provided, for example cutting, drilling or more.

One disadvantage of known solutions is the complexity of managing the movement times of the various components to be assembled so that each component reaches the correct processing station at the right time, all while taking into consideration the cycle times of the different processing, which are typically different for the different processing.

The timing of the movements of the components is very complex, since it should be correlated to the cycle times of the various processing provided on the line. It is clear that the processing that takes longer represents a possible inefficiency, since it can typically occur that several components are stopped, waiting to be processes by such station, which can lengthen the cycle time of the machine.

One disadvantage of known solutions is therefore not efficiently managing the movement of the components to be assembled to achieve a productivity that is compatible with that of an automated industrial processing plant.

In some known solutions, such processing stations are disposed in sequence one after the other according to a layout with a predominantly linear development, in which the objects to be processed are made to advance along the processing path by means of suitable linear conveyors.

In other known solutions, the processing stations are disposed in succession at the peripheral edge of as many rotatable conveyors, for example of the carousel type, each rotating about a corresponding axis of rotation, in which the objects to be assembled are transferred between the various carousels. In this case, the step of transferring the objects to be assembled between the carousels is critical in known apparatuses and methods, because the very objects can fall and become damaged. It must also be considered that the carousels are moved autonomously and at speeds that can even differ from each other. This entails a further complication in managing the movements of the components to be assembled, since it is necessary to control, suitably and in a coordinated manner, the linear or angular speed of rotation of the conveyors, with a consequent reduction in the productivity of known apparatuses.

Another disadvantage of known apparatuses lies in their layout, which occupies a considerable overall space regardless of whether it is of the linear type, or provided with rotatable carousels, therefore known apparatuses are also difficult to design, install and assemble, especially if the same apparatuses have to be integrated into an already existing plant.

There is therefore the need to perfect an apparatus and to develop a method for assembling multi-component objects, which can overcome at least one of the disadvantages of the state of the art.

In particular, one purpose of the present invention is to provide an apparatus and to develop a method for assembling multi-component objects, which are able to achieve high or very high productivity, of the order of magnitude of at least several hundred units produced per minute.

Another purpose of the invention is to provide an apparatus for assembling multi-component objects that has limited overall sizes and that can, if necessary, be easily integrated into an automated industrial processing plant, whether already existing or newly designed and/or built.

Another purpose is to provide an apparatus and to develop a method for assembling multi-component objects able to guarantee a safe advance of the latter along the processing path.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, hereafter we describe an apparatus and a method for assembling multi-component objects, which overcome the limits of the state of the art and eliminate the defects present therein.

In accordance with some embodiments, there is provided an assembly apparatus for assembling together a first component and at least one second component, so as to make up a multi-component object.

The assembly apparatus comprises at least a first loading station for loading the components that make up the multi-component object, and an unloading station for unloading the multi-component object after the assembly of its components.

The assembly apparatus comprises a second loading station located in an intermediate position between the first loading station and the unloading station.

The second loading station is able to receive one or more components for the assembly of the multi-component object.

The assembly apparatus also comprises a first conveyor member mobile along a closed path, for example a ring-shaped path, that passes through the three stations as above, and first support means integral with the first conveyor member and configured to temporarily and selectively support at least one of the first components and of the second components. The first support means are divided into two groups disposed on the first conveyor member on opposite sides along the path, so that when a first group of the two groups is located in correspondence with the first loading station, a second group of the two groups is located in correspondence with the unloading station. First actuation means are also provided, connected to the first conveyor member in order to make it advance selectively along the path.

The assembly apparatus also comprises a second conveyor member, substantially the same as and overlapping with the first conveyor member. With the term "overlapping", here we mean that the two conveyor members, which are substantially the same as each other, are located one on top of the other in such a way as to share the same path defined above.

Second support means are made integral with the second conveyor member in order to temporarily and selectively support at least one of the first components and of the second components. The second support means are divided into two groups disposed on the second conveyor member on opposite sides, preferably in such a way that when a first of the two groups is located in correspondence with the first loading station, the second of the two groups is located in correspondence with the unloading station. The two groups of the second support means are also angularly offset along the path with respect to the two groups of the first support means.

Second actuation means are also provided, connected to the second conveyor member in order to make it advance selectively along the path.

The assembly apparatus also comprises control means connected both to the first actuation means and also to the second actuation means, in order to selectively command them so that the first and second conveyor members move independently one with respect to the other along the path.

In accordance with some embodiments, the second loading station is equidistant from the first loading station and from the unloading station. Preferably, the first loading station and the unloading station are in reciprocally opposite positions along the path.

It is advantageous to provide that the control means are configured so that when a group of the first support means is disposed in the second loading station, a group of the second support means is disposed in the first loading station, and more advantageously the second group of the second support means is disposed in the unloading station, and vice versa.

Preferably, the first support groups and the second support groups are disposed on a same horizontal work plane on which the first component lies while it is moved along the path. For this purpose, the support groups are preferably connected to the corresponding conveyor member by means of vertically oriented spacers.

According to some embodiments described here, the assembly apparatus also comprises a transfer device that can be moved between a pick-up position, in which it picks up at least one component in correspondence with a pick-up zone, and a release position, in which it releases the at least one component in correspondence with the second loading station. Preferably, the pick-up zone is located outside the path.

Preferably, the transfer device is configured as an arm equipped with at least one manipulation member configured to at least pick up the second component.

Preferably, the arm is mounted rotatable about an axis of rotation in such a way as to move between the pick-up position and the release position by rotating about the axis of rotation. The rotation advantageously occurs for an arc of a circle of predefined amplitude. The axis of rotation can be perpendicular to the plane of the conveyor, or to the plane in which the closed path is comprised.

According to another aspect, there is provided an assembly method to assemble together at least one first component, which acts as a base component, and at least a second component to be joined to the first component, in order to make up a multi-component object. For example, the multi-component object can be a closing member for containers, comprising a closing body as the first component, to which a barrier element configured as an aluminum disc is assembled as an additional component.

The method is carried out by means of an assembly apparatus preferably of the type indicated above, in particular which comprises at least a first loading station for loading the components, an unloading station for unloading the multi-component object, once the first and the second component have been assembled together, an intermediate second loading station, disposed between the first loading station and the unloading station, so that it can receive at least one second component in order to join it to at least one first component.

The method comprises the steps of providing a first conveyor member mobile along closed path, for example a a ring-shaped path, which passes through the three stations as above; providing first support means integral with the first conveyor member so that they temporarily and selectively support at least one of the first and second components; providing first actuation means connected to the first conveyor member in order to make it advance selectively along the path.

The first support means are divided into two groups disposed on the first conveyor member on opposite sides along the path, so that when a first of the two groups is located in the first loading station, a second of the two groups is located in the unloading station.

The method also comprises the steps of providing a second conveyor member, substantially the same as and overlapping with the first conveyor member; providing second support means integral with the second conveyor member so that they temporarily and selectively support at least one of the first and second components; and providing second actuation means connected to the second conveyor member in order to make it advance selectively along the path.

Similarly to the first support means, the second support means are divided into two groups disposed on the second conveyor member on opposite sides and angularly offset along the path with respect to the first support means.

Control means are also provided, connected both to the first actuation means and also to the second actuation means in order to selectively command them so that the first and second conveyor members move independently one with respect to the other along the path.

In accordance with some embodiments, the method comprises the step of providing a transfer device to feed the second components from a pick-up zone located outside the path as above to the second loading station.

Preferably, the assembly method also provides to command, by means of the control means, first actuation means in order to move a group of first support means in correspondence with the first loading station, and then to feed at least one first component thereto. In particular, the at least one first component is fed on one of the support means present in the first loading station.

It is then provided to command, again by means of the control means, the first actuation means in order to move the first support means, which support the at least one first component, from the first to the second loading station, and then to feed at least one second component thereto. In particular, the at least one second component is fed on the support means so as to be assembled to the first component, thus forming a multi-component object.

Subsequently, it is provided to command, by means of the same control means, the first actuation means in order to move the first support means from the second loading station to the unloading station.

Advantageously, during the movement of the first support means between the first and the second loading stations, it is provided to command, by means of the control means, the second actuation means in order to move a group of second support means into the first loading station.

Preferably, during the feed of the at least one second component, there is provided a stop of the first support means in the second loading station. In this case, during the stop, it is provided to command, by means of the control means, the second actuation means in order to move the second support means from the first loading station to an intermediate position, disposed between the first and the second loading stations. In this movement step, the second support means preferably support at least one first component which has been previously fed to the first loading station.

The method and the apparatus according to the present invention are extremely versatile and allow to increase productivity, in terms of the number of multi-component objects assembled in the unit of time.

This is achievable thanks to the fact that the first and second support means of the components are mobile independently from each other in order to optimize the stopping times in each of the stations of the first and second support means with the first components and second components on board. Thanks to this, the apparatus according to the present invention in fact constitutes a system with a variable pitch between the adjacent groups of support means, which allows to move some groups while other groups are stopped at a processing station, thus optimizing the overall cycle times for processing the components to be assembled in order to produce the multi-component object.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 1 is a schematic and plan view of a first embodiment of the apparatus according to the present invention;

FIG. 2 is a schematic and plan view of a conveyor comprised in an apparatus for assembling multi-component objects according to the present invention;

FIG. 3 is a lateral view of a support mean that supports a first component and a second component;

FIG. 4 is a schematic front view of the conveyor of FIG. 2;

FIG. 5 is a schematic and plan view of a second embodiment of the apparatus according to the present invention; and FIG. 6 is a schematic perspective view, from above, of an example of a closing member for containers obtainable through the assembly method and apparatus according to the present invention.

We must clarify that in the present description and in the attached claims the terms horizontal, vertical, lower, upper, high and low, with their declinations, have the sole function of better illustrating the present invention with reference to the drawings and must not be in any way used to limit the scope of the invention itself, or the field of protection defined by the attached claims. For example, by the term horizontal we mean an axis, or a plane, that can be either parallel to the line of the horizon, or inclined, even by several degrees, for example up to 20°, with respect to the latter.

Furthermore, the people of skill in the art will recognize that certain sizes or characteristics in the drawings may have been enlarged, deformed, or shown in an unconventional or non-proportional way in order to provide a version of the present invention that is easier to understand. When sizes and/or values are specified in the following description, the sizes and/or values are provided for illustrative purposes only and must not be construed as limiting the scope of protection of the present invention, unless such sizes and/or values are present in the attached claims.

To facilitate comprehension, the same reference numbers have been used, where possible, to identify identical common elements in the drawings. It is understood that elements and characteristics of one embodiment can be conveniently combined or incorporated into other embodiments without further clarifications.

Description of Some Embodiments of the Present Invention

With reference to FIGS. 1 and 5, an apparatus 10, according to the present invention, is configured to assemble, for example and without limitations in general, multi-component objects 100 (FIG. 6), although it can assemble many types of different multi-component objects, for example semi-finished products or groups of components that form pre-assembled sets in an automated way, and which are normally then made available for subsequent processing. In the present description and in the attached claims, the objects are called multi-component because they comprise a base component to which one or more other components are assembled, and they can belong to any technical sector whatsoever. An example of the multi-component objects as above are caps, preferably closeable, for containers suitable to contain, for example, liquid, semi-liquid, or pasty substances, preferably of a food, cosmetic or pharmaceutical nature.

To better understand the subsequent detailed description of the apparatus 10 (FIGS. from 1 to 5), an example of a multi-component object 100 (FIG. 6) is now described, which comprises a closing body 101, which acts as the first component, or base component, with a substantially cylindrical tubular shape, and a barrier element 102, which acts as the second component. In the example shown here, the barrier element 102 is attached, for example by welding, preferably by induction, to an internal surface of the closing body 101, in such a way that, during use, the multi-component object 100 can hermetically close the corresponding container.

Obviously, other types of second components 102, not shown in the drawings, can be provided, such as for example an opening element able to be activated at the first opening of the closing member in order to open another closing member of the container, for example a membrane. It can also be provided to add one or more additional components to the first component 101, according to requirements.

The first component 101 can be formed by molding and fed, already formed, toward the apparatus 10. At least a part of the additional components 102 can also be fed, already formed, toward the apparatus 10, so as to then be assembled to the first component 101.

In accordance with a first embodiment of the present invention, the apparatus 10 comprises a first belt 21 equipped with first supports 22 and a second belt 31 equipped with second supports 32. The supports 22, 32 are integral with their corresponding belt 21, 31 and move along a closed path P defined by the belts 21, 31. In particular, in the example given here, the path P has a substantially rectangular shape, and it is common to both belts 21, 31.

The path P extends in succession through a first loading station S1, in correspondence with which the base components 101 are fed, a second loading station S2, in correspondence with which the additional components 102 are fed, and an unloading station S3, in correspondence with which the multi-component objects 100 obtained through the assembly of the base components 101 fed to the first loading station S1 and the additional components 102 fed to the second loading station S2 move away from the apparatus 10 (FIG. 2).

The second loading station S2 is equidistant from the first loading station S1 and from the unloading station S3, which are in opposite positions with respect to each other. In particular, the first loading station S1 and the unloading station S3 are each located at a respective short side of the rectangular path P, and the second loading station S2 is in a substantially central position of one of the long sides of the rectangular path P.

The first and second supports 22, 32 are each divided into a first group 22A, 32A and a second group 22B, 32B. As can be seen from FIGS. 1, 2 and 5, the first group 22A, 32A and the second group 22B, 32B of the supports of a same belt 21, 31 are disposed in opposite positions with respect to each other along the path P. In this way, when the first group 32A of second supports 32 is in the first loading station S1, the second group 32B of second supports 32 is in the unloading station S3.

It should also be noted that the first and second groups 32A, 32B of second supports 32 are angularly offset along the path P with respect to the groups 22A, 22B of first supports 22. In particular, one of the groups 22A, 22B of first supports 22 can be in the second loading station S2 when the groups 32A, 32B of second supports 32 are in the first loading station S1 and in the unloading station S3, as shown in FIGS. 1, 2 and 5, or they can be in a position closer to the groups 32A, 32B of second supports 32, as shown with a dashed line in the same drawings.

In the example shown, each group 22A, 22B, 32A, 32B comprises three supports 22, 32; however, the number of supports of each group can obviously vary according to requirements. Each support 22, 32 is for example configured as a plate with sizes such as to receive a single base component 101 and a single additional component 102, the latter being overlapping on the base component 101, as shown schematically in an exaggeratedly enlarged manner and not to scale in FIG. 3. In the example shown, the supports 22, 32 are not provided with lateral barriers, but it is clear that these can be provided.

The two groups 22A, 22B of first supports 22 therefore move in unison, since they are connected to the first belt 21 which is driven by a first motor 23. Similarly, the two groups 32A, 32B also move in unison, since they are connected to the second belt 31, driven by a second motor 33 distinct from the first motor 23.

As an alternative to the belt, it is possible to use other drawing systems, such as a chain.

Each motor 23, 33 is directly connected to a respective driven roller 24, 34 which allows to actuate the movement of the corresponding belt 21, 31 (FIG. 4). In addition to the first driven roller 24 and the second driven roller 34, another three first idle rollers 25 and another three second idle rollers 35 are provided. The first driven roller 24 and the three first idle rollers 25 are disposed in a rectangle, thus allowing the substantially rectangle-shaped configuration of the first belt 21, which gives the path P the substantially rectangular shape.

The second driven roller 34 and the three second idle rollers 35 are disposed above the first rollers 24, 25 and are aligned with them, so as to give the second belt 31 the same substantially rectangular shape as the first belt 21, thus making the path P common to both belts 21, 31.

The two belts 21, 31 are disposed one above the other, as shown in FIG. 4. In this case, the first and second supports 22, 32 are mounted on respective spacers 26, 36 in such a way as to be all in a same work plane L (FIGS. 3 and 4), which is substantially horizontal. In the example shown, the first belt 21 is below the work plane L and the second belt 31 is above the same work plane L; however, it is possible to provide that both belts 21, 31 are on the same side of the work plane L (that is, below or above), provided they are at two different heights.

The motors 23, 33 are both connected to a control unit 40 configured to command them and manage their actuation independently of each other.

The apparatus 10 also comprises a transfer arm 50, shown in FIGS. 1 and 5, which is configured to transfer an additional component 102 from a pick-up zone Q to the second loading station S2. The pick-up zone Q is to be considered external, since it is not disposed along the path P, therefore the supports 22, 32 of the belts 21, 31 do not pass through it.

The arm 50 can therefore be moved between a pick-up position, in which it picks up an additional component 102 in correspondence with the pick-up zone Q, and a release position, in which it releases the additional component 102 in correspondence with the second loading station S2 (FIGS. 1 and 5).

For this purpose, the arm 50 is pivoted around an axis of rotation R that is vertical or substantially vertical, and therefore perpendicular to the plane of the sheet in the drawings, so as to rotate between the pick-up position and the release position, as shown in FIGS. 1 and 5.

In the example shown, the arm 50 is configured to pick up and transfer three samples of additional component 102, so as to release each of them on a respective support 22, 32 of a respective group 22A, 22B, 32A, 32B.

The arm 50 can also be configured to process or perform a treatment (for example the application of a substance) on the additional component 102, so as to facilitate or even perform the assembly with the base component 101. The process or treatment, if provided, can be performed in correspondence with the second loading station S2 or in correspondence with the pick-up zone Q.

Generally, the pick-up zone Q is of any type whatsoever, in which a plurality of samples of additional component 102 are available to be picked up and transferred toward the second loading station S2. The latter can be, for example, a station in which the samples of additional component 102 can be fed in orderly succession from a tank.

It can also be provided, as shown in FIG. 5, that the additional components 102 are fed to the pick-up zone Q by means of another unit of the same type as the unit described so far, if not exactly identical to it. In particular, the second unit comprises a first belt 61 equipped with first supports 62 organized into two opposite groups 62A, 62B of three first supports 62, and a second belt 71 equipped with second supports 72 also divided into two groups 72A, 72B opposite each other and each made up of three second supports 72. The groups 62A, 62B of first supports 62 are angularly offset with respect to the groups 72A, 72B of second supports 72 along a path P2 defined by the belts 62, 72. More specifically, the pick-up zone Q is located on the path P2 in such a way that the path P2 passes through it, in the same way that the path P of the first unit passes through the loading stations S1, S2 and the unloading station S3. For example, the pick-up zone Q can coincide with one of the loading and unloading stations of the second unit.

By doing so, the additional component 102, if it needs to be prepared, can be picked up and transferred immediately after being prepared, for example pre-assembled or treated with a protective or adhesive substance.

In this case, it is advantageous that the supports 62, 72 of the second unit are in the same number as the supports 22, 32 of the first unit, and organized in the same way.

It should be noted that, in the event that several different additional components have to be assembled to the closing body, the apparatus 10 can comprise just as many arms 50, and therefore just as many pick-up zones Q, for simplicity not shown in the attached drawings. The pick-up zones Q can be disposed, indifferently, either in correspondence with a feed from a tank or suchlike, or in correspondence with another conveyor, allowing the transfer of a component that has just been completed or processed.

The apparatus 10 for assembling multi-component objects is configured to actuate an assembly method, which this application aims to protect.

The assembly method initially provides to prepare an assembly apparatus 10 as described above.

The base component 101 is fed to the first loading station S1, where there is already a group 22A, 22B, 32A, 32B of supports 22, 32 (FIGS. 1, 2 and 5). Taking as an example a group 22A, 22B of first supports 22, the control unit 40 drives the motor 23 in order to move the belt 21, so as to move the supports 22, each of which supports a respective first component 101, up to the second loading station S2.

At this point, three additional components 102 are fed by means of the arm 50, which has just picked them up in the pick-up zone Q. The three additional components 102 are then released at the second loading station S2, each one on a respective support 22, in particular already in a position of assembly with the base component 101, as schematically shown in FIGS. 1, 2, 3 and 5. As mentioned, it can be provided that the assembly itself occurs in the second loading station S2, by means of the arm 50.

The motor 23 is again commanded by the control unit 40 in order to move the supports 22, which support the multi-component objects 100 thus assembled, up to the unloading station S3, where the multi-component objects 100 are unloaded so as to be transferred toward other processing stations.

It should be noted that while the control unit 40 drives the motor 23 to move the first supports 22, it simultaneously and selectively drives the motor 33 to move the second belt 31 while the first belt 21 is moving. For example, while the first supports 22 are moved, the second supports 32 are also in turn moved.

In particular, it can be provided that during the feed of the additional component 102 on the first supports 22 to the second loading station S2, and its assembly to the base component 101, the control unit 40 commands the second motor 33 so as to make the second supports 32 advance from the first loading station S1 up to a position close to the second loading station S2, shown with a dashed line in FIGS. 1 and 2. The second supports 32 are loaded with base components 101 ready to receive as many additional components 102.

In this way, it is possible to optimize the stopping times in the three stations S1, S2, S3 described above of the apparatus 10.

It is clear that modifications and/or additions of parts or steps may be made to the apparatus and method as described heretofore, without departing from the field and scope of the present invention as defined by the claims.

In the following claims, the sole purpose of the references in brackets is to facilitate reading and they must not be considered as restrictive factors with regard to the field of protection claimed in the specific claims.

The invention claimed is:

1. Assembly apparatus for assembling together at least one first component and at least one second component in order to make up a multi-component object, wherein said apparatus comprises at least:

a first loading station configured for loading said components, an unloading station configured for unloading said multi-component object, an intermediate second loading station disposed between said first loading station and said unloading station;

a first conveyor member mobile along a ring-shaped path which passes through said stations;

first support means integral with said first conveyor member in order to temporarily and selectively support at least one of said first components and second components, wherein said first support means are divided into two groups disposed on said first conveyor member on opposite sides along said path, so that when a first group of said two groups is located in correspondence with said first loading station, a second group of said two groups is located in correspondence with said unloading station;

first actuation means connected to said first conveyor member in order to make said first actuation means advance selectively along said path;

said assembly apparatus it further comprising:

a second conveyor member substantially the same as and overlapping with said first conveyor member;

second support means integral with said second conveyor member in order to temporarily and selectively support at least one of said first components and second components, wherein said second support means are divided into two groups disposed on said second conveyor member on opposite sides and angularly offset along said path with respect to said first support means second actuation means connected to said second conveyor member in order to make said second actuation means advance selectively along said path; and control means, connected to said first actuation means and to said second actuation means in order to selectively command them so that said first and second conveyor members move independently one with respect to the other along said path.

2. Apparatus as in claim 1, wherein the second loading station is equidistant from the first loading station and from the unloading station.

3. Apparatus as in claim 1, wherein said control means are configured so that when a group of said first support means is disposed in said second loading station, a group of said second support means is disposed in said first loading station and in said unloading station, and vice versa.

4. Apparatus as in claim 1, wherein the first support means and the second support means are disposed in a same horizontal work plane on which the first component rests while the first component moves along the path.

5. Apparatus as in claim 1, further comprising a transfer device configured to be moved between a pick-up position, in which said transfer device picks up said second component in correspondence with a pick-up zone, and a release position, in which said transfer device releases said second component in correspondence with the second loading station, wherein said pick-up zone is outside the path of said first and second support means.

6. Apparatus as in claim 5, wherein the transfer device comprises an arm configured to pick up the second component and to move between the pick-up position and the release position by rotating about an axis of rotation.

7. Assembly machine comprising a first apparatus as in claim 5, further comprising a second apparatus, wherein the pick-up zone is passed through by the path along which the first conveyor member and the second conveyor member of said second apparatus are mobile.

8. Assembly method to assemble together at least one first component and at least one second component in order to make up a multi-component object, by means of an assembly apparatus comprising at least a loading first station for loading said components, an unloading station for unloading said multi-component object, and an intermediate second loading station disposed between said first loading station and said unloading station, so that it can receive said at least one second component in order to join it to said at least one first component;

said method comprising:

providing a first conveyor member mobile along a closed path which passes through said three stations;

providing first support means integral with said first conveyor member so that said first support means temporarily and selectively support at least one of said first components and second components, wherein said first support means are divided into two groups disposed on said first conveyor member on opposite sides along said path, so that when a first group of said two groups is located in correspondence with said first loading station, a second group of said two groups is located in correspondence with said unloading station;

providing first actuation means connected to said first conveyor member in order to make said first actuation means advance selectively along said path;

providing a second conveyor member substantially the same as and overlapping with said first conveyor member;

providing second support means integral with said second conveyor member so that said second support means temporarily and selectively support at least one of said first components and second components, wherein said second support means are divided into two groups disposed on said second conveyor member on opposite sides and angularly offset along said path with respect to said first support means;

providing second actuation means connected to said second conveyor member in order to make said second actuation means advance selectively along said path; and providing control means, connected to said first actuation means and to said second actuation means in order to selectively command them so that said first and second conveyor members move independently one with respect to the other along said path.

9. Method as in claim 8, further comprising providing a transfer device for feeding the second components to the second loading station starting from a pick-up zone outside the path.

10. Method as in claim 8, further comprising:

commanding, by means of the control means, said first actuation means in order to move a group of first support means into the first loading station;

feeding at least a first component to the first loading station on said first support means;

commanding, by means of said control means, said first actuation means in order to move said group of first support means to the second loading station;

feeding at least a second component to said second loading station on said first support means and assembling said second component to said first component in order to make up at least one multi-component object; and commanding, by means of said control means, said first actuation means in order to move said first support means to the unloading station.

11. Method as in claim 10, wherein during the movement of the first support means between the first loading station and the second loading station, it is provided to command, by means of the control means, said second actuation means in order to move a group of second support means into the first loading station and another group of second support means into the unloading station.

12. Method as in claim 10, wherein during the feed of the at least one second component, there is provided a step of stopping the first support means or alternatively the second support means in the second loading station, and in that during said stopping step it is provided to command, by means of the control means, the first or second actuation means in order to move the first or the second support means, which are disposed in the first loading station, toward an intermediate position, disposed between said first loading station and said second loading station, in the proximity of the latter.

* * * * *